Dec. 19, 1933.  D. L. McNEAL  1,939,912
VALVE DEVICE
Filed June 7, 1932

INVENTOR.
DONALD L. McNEAL
By *Wm. H. Cady*
ATTORNEY.

Patented Dec. 19, 1933

1,939,912

UNITED STATES PATENT OFFICE 1,939,912

VALVE DEVICE

Donald L. McNeal, Wilkinsburg, Pa., assignor to The Westinghouse Air Brake Company, Wilmerding, Pa., a corporation of Pennsylvania Application June 7, 1932. Serial No. 615,778

2 Claims. (Cl. 251—145)

This invention relates to a valve device of the type particularly adapted to control the flow of fluid under pressure from one chamber to another chamber.

In valve devices of the type having an abutment movable by fluid under pressure or a spring to a position for effecting a seal, a metal seat rib is usually provided to engage and effect a seal against a gasket having a flat sealing surface.

One object of my invention is to provide an improved valve device in which a gasket of soft material is provided with a seat rib for effecting a seal against a flat surface of metal or other hard material.

The particular advantage of providing the seat rib on the gasket instead of in the casing, is that a material saving in the cost of manufacturing is effected. Heretofore, a metal seat rib has required special machining, but by providing the seat rib on the gasket, the seat rib is molded integral with the gasket and at the same time as the gasket is molded, without any material increase in the cost of manufacture.

In valve devices provided with a movable abutment subject to the pressure of a spring, it is desirable to provide means for adjusting the pressure of the spring.

Another object of my invention is to provide improved means for adjusting the pressure of a spring acting on a movable abutment.

I attain this object by providing at one end of the spring a plurality of shims by means of which the pressure of the spring on the abutment can be accurately adjusted.

Another object of my invention is to provide improved means for removably retaining spring adjusting shims in the casing of the valve device upon disassembling the valve device, so that once a spring is properly adjusted, its adjustment will not be changed by the loss of shims or otherwise during cleaning or repair operations.

Figure 1:
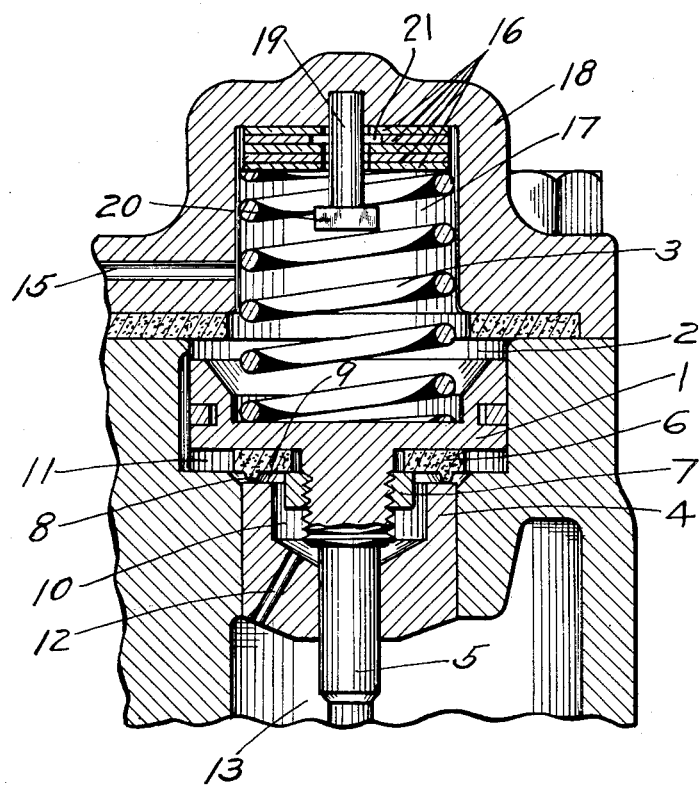
Figure 2:
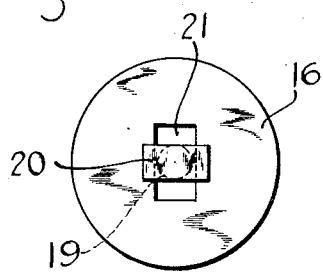

In the drawing, Fig. 1 is a diagrammatic view of a portion of a valve device embodying my improvements; and Fig. 2 is a plan view of a shim and means for removably retaining the shim in the valve device shown in Fig. 1.

As shown in the drawing, the valve device comprises a casing containing a movable abutment 1 having at one side a chamber 2 containing a spring 3 acting on said abutment. A bushing 4 is preferably pressed into a suitable bore in the casing and the abutment 1 is provided with an operating stem 5 slidably extending through a suitable bore in said bushing. A gasket 6 is secured to one side of the abutment 1 by means of a nut 7 having screw-threaded engagement with the stem 5.

According to one feature of my invention, the gasket 6 is provided with an annular seat rib or bead 8 adapted to be pressed into sealing engagement with the flat end 9 of the bushing 4, so as to act as a valve and to prevent leakage from a chamber 10 to a chamber 11. Chamber 10 is connected through a passage 12 to a chamber 13 which may be supplied with fluid under pressure, so that the pressure of fluid in chamber 13 will act in chamber 10, within the gasket bead 8, to move the abutment 1 away from the bushing 4 against the opposing pressure of spring 3. The chamber 2 may be open to the atmosphere through a passage 15, thereby ensuring the control of the abutment 1 by the opposing pressures of spring 3 and the pressure of fluid in chamber 10 acting on said abutment within the gasket seat rib 8.

In order to provide for varying the pressure of spring 3 on the abutment 1, shims 16 are employed back of the spring, said shims being mounted in a recess 17 formed in the cover portion or plate 18 of the casing.

The shims 16 are removably retained in the recess 17 by means of a pin 19, which extends through an aperture 21 in said shims and is tightly pressed into a suitable bore provided in the end wall of said recess. The aperture 21 through said shims is preferably rectangular in shape and the pin 19 is provided with a head 20 corresponding in shape but slightly smaller in size than the aperture through said shims. In order to place a shim 16 on the pin 19, the aperture through the shim is first lined up with the head 20 of pin 19, the shim is then moved over said head onto the pin 19 and then turned so that the aperture 21 is out of alignment with the head 20, in which position the shim 16 is prevented from falling out of the recess 17 if the cover portion 18 is removed. In case it is desirable to remove a shim 16 from the recess 17, the above operation is reversed, as will be evident.

By employing shims 16 under one end of the spring 20 the pressure of said spring on the abutment 1 may be varied as necessary, and it will be noted that the shims are readily removable from recess 17 or more shims may be added in said recess if necessary, but the head 20 on the pin 19 is adapted to prevent the shims accidentally falling out of the cover portion 18 in case said cover portion is removed from the casing.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve device comprising a casing, a movable abutment mounted in said casing, a spring acting on said abutment, a cover plate for said casing, shims interposed between said spring and said cover plate, said shims being provided with a rectangular shaped aperture, and a pin mounted in said cover plate and having a rectangular shaped head adapted to pass through the apertures in the shims to permit assembly of the shims on the pin.

2. A valve device comprising a casing, a movable abutment mounted in said casing, a spring acting on said abutment, a cover plate for said casing, shims interposed between said spring and said cover plate, said shims being provided with a rectangular shaped aperture, and a pin mounted in said cover plate and extending through the apertures in said shims, said pin having a rectangular shaped head adapted to pass through the apertures in said shims and thereby permit the assembly of the shims on said pin, said head serving as a retaining means for said shims upon the rotation of said shims from the position in which said apertures align with said head.

DONALD L. McNEAL.